Oct. 17, 1944. W. H. CHURCHILL 2,360,647
FASTENER SECURED INSTALLATION AND FASTENER THEREFOR
Filed June 13, 1942
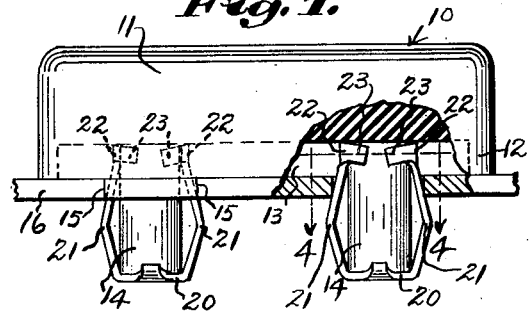
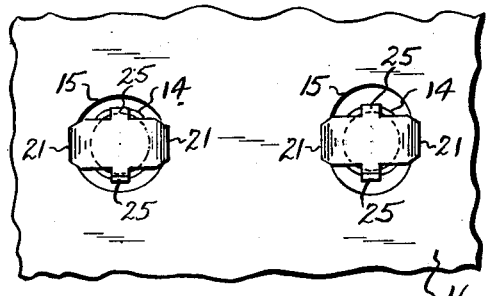
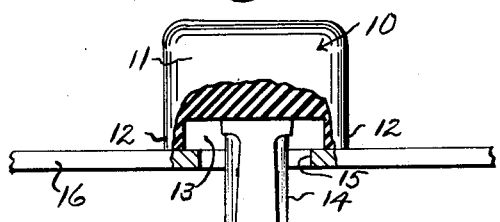
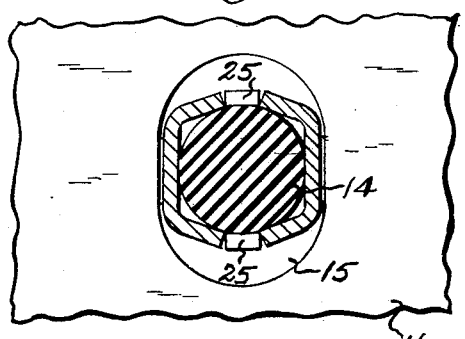
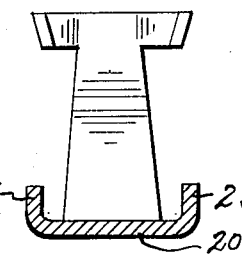
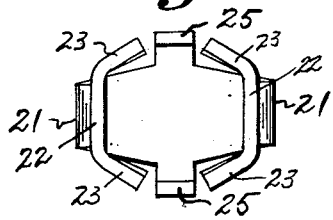
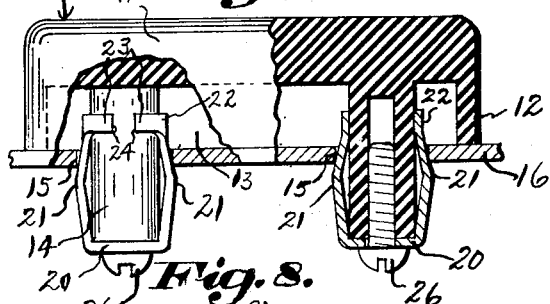
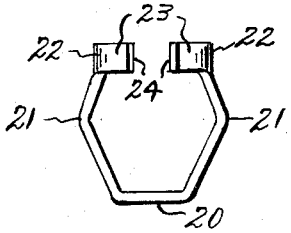
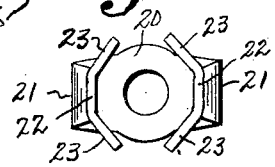
Inventor:
Wilmer H. Churchill.
by Walter S. Jones
Att'y.

Patented Oct. 17, 1944

2,360,647

UNITED STATES PATENT OFFICE 2,360,647

FASTENER SECURED INSTALLATION AND FASTENER THEREFOR

Wilmer H. Churchill, Saugus, Mass., assignor to United-Carr Fastener Corporation, Cambridge, Mass., a corporation of Massachusetts Application June 13, 1942, Serial No. 446,872

2 Claims. (Cl. 24—73)

The present invention relates to fastener secured installations and aims generally to improve and simplify existing installations as well as the fastener therefor.

One of the principal aims and objects of the invention is the provision of an improved fastener installation to secure a stem of a supported part, which may be of plastic or other material, to an apertured support, which may be of thin sheet metal.

A further object of the invention is the improvement and simplification of the construction of the fastener per se for such installation.

Illustrative of the invention, reference is made to the accompanying drawing illustrating two forms of the invention, and in which:

Fig. 1 is a side elevation, partly in section, illustrating one form of fastener secured installation according to the invention;

Fig. 2 is a bottom plan view thereof;

Fig. 3 is an end elevation thereof, partly in section;

Fig. 4 is a horizontal section taken on the line 4—4 of Fig. 1;

Fig. 5 is a transverse central sectional view of the fastener;

Fig. 6 is a top plan view thereof;

Fig. 7 is a side elevation partly in section of a fastener secured installation according to a modified form of the invention;

Fig. 8 is a top plan view of the second form of fastener per se; and

Fig. 9 is a side elevation thereof.

According to the invention, the installation comprises a cup-shaped part having one or more interior stems extending below the rim thereof with which is associated a fastener member adapted for snap fastener engagement with the apertured support, such as an apertured sheet metal part.

The part 10 to be supported may be of any suitable construction and shape, may be made of any suitable material, and, desirably, may be of a plastic composition.

Advantageously, the part 10 comprises a body 11 and a peripheral rim 12 providing a hollow interior 13. Depending from the body 11 and within the interior 13 are one or more studs 14, which may be of plastic composition, and which may be cylindrical in shape. The stud or studs 14 extend downwardly below the outer edge of the rim 12 and are adapted to be inserted in apertures 15 (which may be round or elongated, as shown in Fig. 2) in a support 16, which may be a sheet metal panel or like part.

Suitable fastening means are provided for securing the part 10 to the support 16 with the edge of the rim 12 in flush-tight engagement with the support, and, preferably, these fasteners engage the studs and have snap fastener engagement with the marginal walls of the support apertures 15.

The fastener member is preferably formed of a single piece of spring sheet metal of general U-shaped form, the bight portion of the U being flat and constituting a base 20 adapted to engage and bear against the end of the stud 14. The legs of the U-shaped fastener have outwardly divergent portions 21 and upper inwardly convergent portions 22, providing bowed legs spaced outwardly from the sides of said stud. The inner terminal ends of said legs are formed with extensions 23 disposed in planes perpendicular to the plane of the base so as to make flush engagement with the surface of the stud 14, said extensions 23 having laterally and slightly twisted angularly extending wings 24 adapted to engage diametrically opposed side portions of the stud. As shown, each extension 23 has two wings 24, one on each end thereof, but, if preferred, each extension may have only one wing, in which case the wings would preferably be diametrically opposed.

In assembly the fasteners may be placed over the ends of the studs 14 with their base portion 20 bearing against the free ends of the studs, and with fingers 25—25 extending upwardly from the base 20 and engaging the side of the stud at opposite points to hold alignment. Upon insertion of the studs and fasteners through the apertures 15 of the support 16, the divergent portions 21 of the fastener legs are first contracted to force the upper ends of the fastener ends inwardly toward each other to securely engage and grip the stud at a plurality of diametrically opposed points. As the studs and fastener are pushed into final fastened position in the support apertures past the outermost bowed portion of the legs, the fastener legs snap into locking engagement with the aperture walls, the upper ends of the legs still gripping the stud under spring tension of the bowed legs, and the twisted portions 24 providing a firm grip on the material of the studs.

The part 10 may thus be securely attached to the apertured support 16 with the edge of the rim 12 in flush engagement with the support, and with the fastener positioned interiorly of the part 10 and concealed from view.

According to one form of the invention (Figs. 1 to 6 inclusive) the base 20 of the fastener may be formed with upstanding fingers 25 which engage the lower end portion of the stud and center the stud and base relative to each other. According to a modified form of the invention the base of the fastener ring may be secured to the stud end by a suitable fastening, such as a screw 26, extending through an aperture in the base and threaded into the stud.

Although I have illustrated and described preferred embodiments of my invention, I do not wish to be limited thereby because the scope of my invention is best defined by the following claims.

I claim:

1. A fastener for securing a stud-like part to an apertured support comprising a U-shaped metal member, the legs of said U being outwardly bowed intermediate their ends for snap fastener engagement with the apertured support and having their free ends spaced to permit passage of said stud-like part between them, and wings extending laterally from at least one side edge of each of said legs at their free ends and each toward the opposite leg for engaging and gripping opposed sides of said stud-like part when said bowed legs are in fastened engagement with said support.

2. A fastener for securing a stud-like part to an apertured support comprising a U-shaped metal member, the legs of said U being outwardly bowed for snap fastener engagement with the apertured support, and wings extending laterally from opposite side edges of each of said legs and disposed in planes perpendicular to said base, said wings having slightly twisted end portions for engaging and gripping diametrically opposed sides of said stud-like part when said bowed legs are in fastened engagement with said support.

WILMER H. CHURCHILL.